(12) United States Patent
Van Gorkom et al.

(10) Patent No.: US 7,731,390 B2
(45) Date of Patent: Jun. 8, 2010

(54) ILLUMINATION SYSTEM WITH MULTIPLE SETS OF LIGHT SOURCES

(75) Inventors: Ramon Pascal Van Gorkom, Eindhoven (NL); Michel Cornelis Josephus Marie Vissenberg, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 12/094,616

(22) PCT Filed: Nov. 20, 2006

(86) PCT No.: PCT/IB2006/054335

§ 371 (c)(1),
(2), (4) Date: May 22, 2008

(87) PCT Pub. No.: WO2007/060594

PCT Pub. Date: May 31, 2007

(65) Prior Publication Data

US 2008/0298053 A1   Dec. 4, 2008

(30) Foreign Application Priority Data

Nov. 22, 2005   (EP) .................................. 05111065

(51) Int. Cl.
  *F21V 9/10*   (2006.01)
(52) U.S. Cl. ...................... 362/231; 362/610; 362/613; 362/249.06
(58) Field of Classification Search .................. 362/610, 362/612, 613, 616, 555, 230, 231, 249.01, 362/249.02, 249.06, 249.14, 237, 240, 241, 362/247
See application file for complete search history.

(56) References Cited

U.S. PATENT DOCUMENTS

| 6,132,072 A | 10/2000 | Turnbull et al. |
| 6,755,547 B2 | 6/2004 | Parker |
| 7,014,336 B1 * | 3/2006 | Ducharme et al. .......... 362/231 |

(Continued)

FOREIGN PATENT DOCUMENTS

DE   10160052 A1   6/2003

(Continued)

*Primary Examiner* — Thomas M Sember

(57) ABSTRACT

The present invention relates to an illumination system (200) including a first sub-system (205) comprising a first set (201) of at least two differently colored light sources where the first set (201) has a first spectral distribution, and a first light mixing device (203) arranged in a direction of emission of light from the first set of light sources and configured to mix light emitted by the first set of light sources. The illumination system further includes a second sub-system (206) comprising a second set (202) of at least two light sources where the second (202) set has a second spectral distribution, and a second light mixing device (204), also arranged in a direction of emission of light from the second set of light sources and configured to mix light emitted by the second set of light sources. The light sources are selected such that that the first and the second spectral distribution complement each other, so that a color rendering index (CRI) of light emitted from the illumination system (200) is greater that the CRI of light emitted from each of the sub-systems. Furthermore, the first (205) and the second (206) sub-systems are arranged to emit at least one common color, such as a shade of white.

11 Claims, 3 Drawing Sheets

U.S. PATENT DOCUMENTS

| | | |
|---|---|---|
| 7,145,125 B2 * | 12/2006 | May et al. .................... 250/228 |
| 7,387,405 B2 * | 6/2008 | Ducharme et al. .......... 362/231 |
| 2004/0105261 A1 | 6/2004 | Ducharme et al. |
| 2004/0218387 A1 | 11/2004 | Gerlach |
| 2005/0002191 A1 | 1/2005 | Shimizu et al. |
| 2005/0047134 A1 | 3/2005 | Mueller et al. |
| 2005/0073244 A1 | 4/2005 | Chou et al. |
| 2005/0128751 A1 | 6/2005 | Roberge et al. |
| 2005/0135117 A1 | 6/2005 | Lamb et al. |
| 2005/0140848 A1 | 6/2005 | Yoo et al. |
| 2005/0141244 A1 | 6/2005 | Hamada et al. |
| 2005/0200295 A1 | 9/2005 | Lim et al. |

FOREIGN PATENT DOCUMENTS

| | | |
|---|---|---|
| DE | 10336974 A1 | 3/2005 |

* cited by examiner

ILLUMINATION SYSTEM WITH MULTIPLE SETS OF LIGHT SOURCES

The present invention relates to an illumination system comprising multiple sets of light sources for emitting light.

Recently, much progress has been made in increasing the brightness of light-emitting diodes (LEDs). As a result, LEDs have become sufficiently bright and inexpensive to serve as a light source in for example lighting system such as lamps with adjustable color, direct view Liquid Crystal Displays (LCDs) and in front and rear projection displays.

By mixing differently colored LEDs any number of colors can be generated, e.g. white. An adjustable color lighting system is typically constructed by using a number of primary colors, and in one example, the three primaries red, green and blue are used. The color of the generated light is determined by which of the LEDs used, as well as by the mixing ratios. To generate "white", all three LEDs have to be turned on.

One of the disadvantages with LEDs is that they are relatively narrow banded. A combination of several primary colors therefore results in a spectrum with a number of peaks, as illustrated in FIG. 1 for the case of white light generated from red, green and blue. This means that although it is possible to make white with three LEDs, this does not necessary yield very natural colors when objects are illuminated with this light. For example, an object which only reflects light in the wavelength range of 470-500 nm, illuminated with the LEDs in FIG. 1, which have wavelength peaks of 450, 530 and 650 nm, will result in the object looking very dark (in the extreme case black), while under outdoor illumination conditions the object will have a cyan color.

The correct rendering of colors from an illumination system is measured with the color rendering index (CRI). Generally a lamp made with only three different colors LEDs has a low color rendering index.

The color rendering index of LED lighting systems can be improved by using more differently colored LEDs. In the example above, adding an amber LED would improve the color rendering index greatly. US 2005/0002191 discloses an illumination light source including four different colored LEDs, but such an illumination light source will still provides for gaps in the spectral distribution. Increasing the number of LEDs further will improve the color rendering index but lead to imperfect mixing of the emitted light, rendering colored shadows on the object to be illuminated.

This problem with colored shadows is for example solved by using a light mixing device, such as a waveguide. However, when too many different colored LEDs are coupled into a waveguide, colored bands may appear in the output light, as internal reflection of light may cause light from the LEDs to exit the illumination system at different angles. Avoiding these problems will lead to a complex and expensive design of the waveguide, or any other technology used for color mixing.

There is therefore a need for an illumination system having an improved CRI, which substantially overcomes the disadvantages of the prior art while providing further improvements in terms of cost, space and manufacturing convenience.

The above need is met by an illumination system as defined in claim 1. The dependent claims define advantageous embodiments in accordance with the present invention.

According to an aspect of the invention, there is provided an illumination system including a first sub-system comprising a first set of at least two differently colored light sources where the first set has a first spectral distribution, and a first light mixing device arranged in a direction of emission of light from the first set of light sources and configured to mix light emitted by the first set of light sources. The illumination system further includes a second sub-system comprising a second set of at least two differently colored light sources where the second set has a second spectral distribution, and a second light mixing device, also arranged in a direction of emission of light from the second set of light sources and configured to mix light emitted by the second set of light sources. The first and the second sub-systems are arranged to emit at least one common color. Furthermore, the light sources are selected such that that the first and the second spectral distribution complement each other, so that a color rendering index (CRI) of light emitted from the illumination system is greater that the CRI of light emitted from each of the sub-systems.

According to the invention, the CRI of the illumination system is thus increased by using a plurality of differently colored light sources, i.e. light sources that each emit light of a different wavelength, but all light sources are not mixed in the same light mixing device. Hereby, problems associated with mixing too many differently colored light sources in one light mixing device are avoided. Instead, each light mixing device only mixes light from a limited number of differently colored light sources, comprised in each set of light sources, and the light from two or more such light mixing devices are used as output from the illumination system. This makes it possible to improve the color rendering index while the number of different colored light sources in each light mixing device is kept to a minimum. The illumination system can of course comprise additional sub-systems. Each of the sub-systems each have a different color gamut. The expression "arranged to emit at least one common color" should here be understood to mean that the color gamut for each of the sub-systems at least partly will overlap. The common color emitted by the sub-systems is preferably a shade of white, e.g. warm white or cold white, but can of course be any other color within the sub-systems overlapping color gamut.

In one case, the light sources in the second set are selected such that the second spectral distribution compensates for at least one local minimum in the first spectral distribution. The fact that different spectral distributions compensate each other here means that local minima of the first and local maxima of the second spectral distributions at least partly overlap each other. The spectra of light emitted from the sub-systems thus combine to form a more evenly distributed spectrum.

For example, the illumination system can be arranged as a color variable lighting system. The colors of one set are chosen slightly different that the colors of another, in order to provide the compensation discussed above. Of course, not all the light sources in the lighting devices need to be different. That is, it possible to use the same color of for example blue in both sets of light sources in the sub-systems. For example, each set can comprise three light sources, e.g. red, green and blue, but also two or four light sources can be used. Preferably, the light sources of each set are chosen to allow generation of white light.

According to a preferred embodiment of the present invention, the spectral distribution of the illumination system, including the first and the second spectral distribution, has a relative intensity that is more than 0.5 for at least 50% of the visible spectrum. The visible spectrum consists of a spectrum of wavelengths which range from approximately 400 nanometers to approximately 700 nm. This means that the light sources should be selected such that at least 50% of the colors within the visible spectrum should be correctly rendered with at least 0.5 of relative intensity. In an even more preferred embodiment, at least 70% of the colors within the visible spectrum should be correctly rendered with at least 0.5 of relative intensity.

The light mixing devices used in the illumination system according to the present invention mixes light such that an essentially uniform spatial and angular color distribution is achieved. Since, according to the present invention, the number of different colored light sources emitting light into each light mixing device is kept to a minimum, it is possible to facilitate the design and construction of the light mixing device without the disadvantages of colored bands mentioned above. In one embodiment, the light mixing device comprises reflective color filters; in another embodiment, the light mixing device comprises at least one wave-guide.

Preferably, the illumination system further comprises means for adjusting the intensity of each of the light sources. This provides for adjustability of the light emitted by the illuminations system, whereby with different color can be emitted.

In one embodiment, the light sources are narrow banded light sources, and can be selected from a group comprising light emitting diodes (LEDs), organic light emitting diodes (OLEDs), polymeric light emitting diodes (PLEDs), an organic LEDs, lasers, cold cathode fluorescent lamps (CCFLs), hot cathode fluorescent lamps (HCFLs), plasma lamps. An illumination system according to the present invention is advantageously used to improve the color rendering index of a combination of such narrow banded light sources. An advantage with a illumination system comprising narrow banded light sources is that it is possible to generate saturated colors.

The invention is advantageously used as a component in for example, but not limited to, a backlighting system. Furthermore, the illumination system according to the present invention can be used together with a display in a display device.

Further features of, and advantages with, the present invention will become apparent when studying the appended claims and the following description. Those skilled in the art realize that different features of the present invention can be combined to create embodiments other than those described in the following.

These and other aspects of the present invention will now be described in more detail, with reference to the appended drawings showing currently preferred embodiments of the invention.

Figure 1:
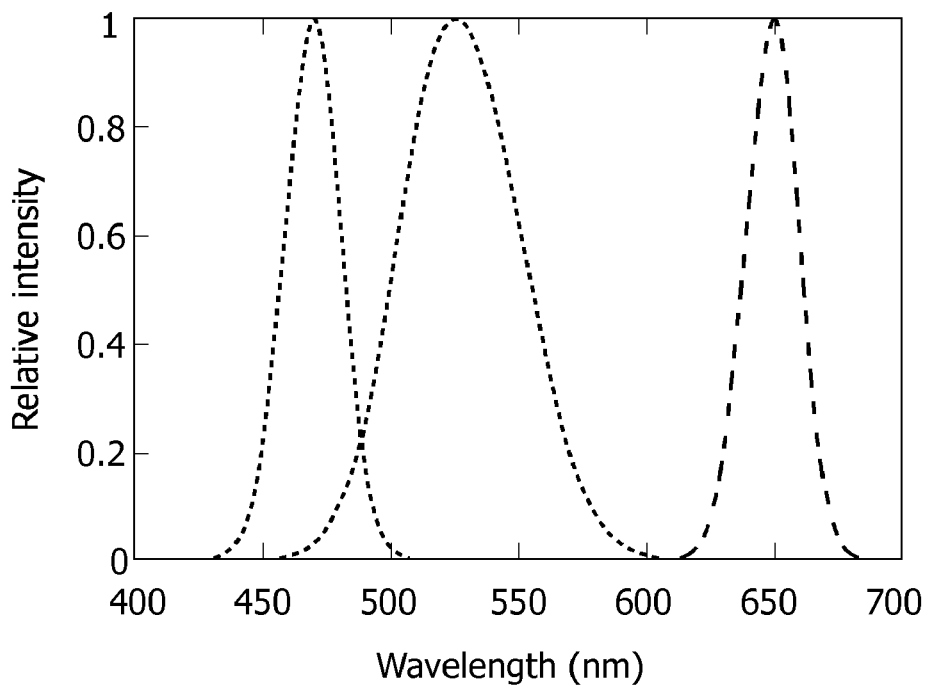
FIG. 1 is a graph showing the spectral distribution for three different LED light sources according to prior art.
Figure 2:
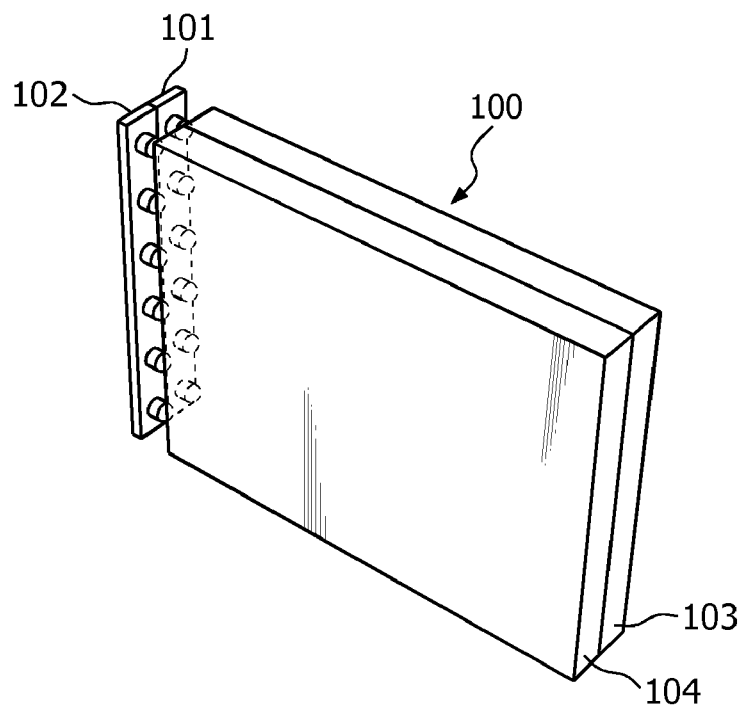
FIG. 2 illustrates an illumination system according to a first embodiment of the invention, having two sets of light sources and waveguides acting as light mixing devices.

In FIG. 2, an illumination system 100, for example a flat transparent lamp, according to a currently preferred embodiment of the present invention is shown. A first set 101 and a second set 102 of light sources are coupled to a first 103 and a second 104 waveguide (one set of light sources and one light mixing device together forms a sub-system), serving as light mixing devices and arranged to transport light from the light sources to the object to be illuminated. The waveguides can be constructed from a transparent material such as glass or polymethyl methacrylate (PMMA). To solve the above described problems with colored bands, the illumination system according to the present invention uses a limited number (for example, but not limited to, two, three or four) differently colored light sources coupled to each waveguide 103, 104. In the exemplary system shown in FIG. 2, the first set 101 comprises blue, green and red LEDs having peak wavelengths of 475, 530 and 650 respectively, and the second set 102 comprises violet, blue/green and orange LEDs having peak wavelengths of 450, 500 and 600 respectively. Consequently, the light beam quality can be maintained while improving the color rendering index. The exemplary illumination system uses two light sources of each color, but the number of light sources of each color may vary depending on the design and construction of the system, for example it is possible to use one light source of each color.

Figure 3:
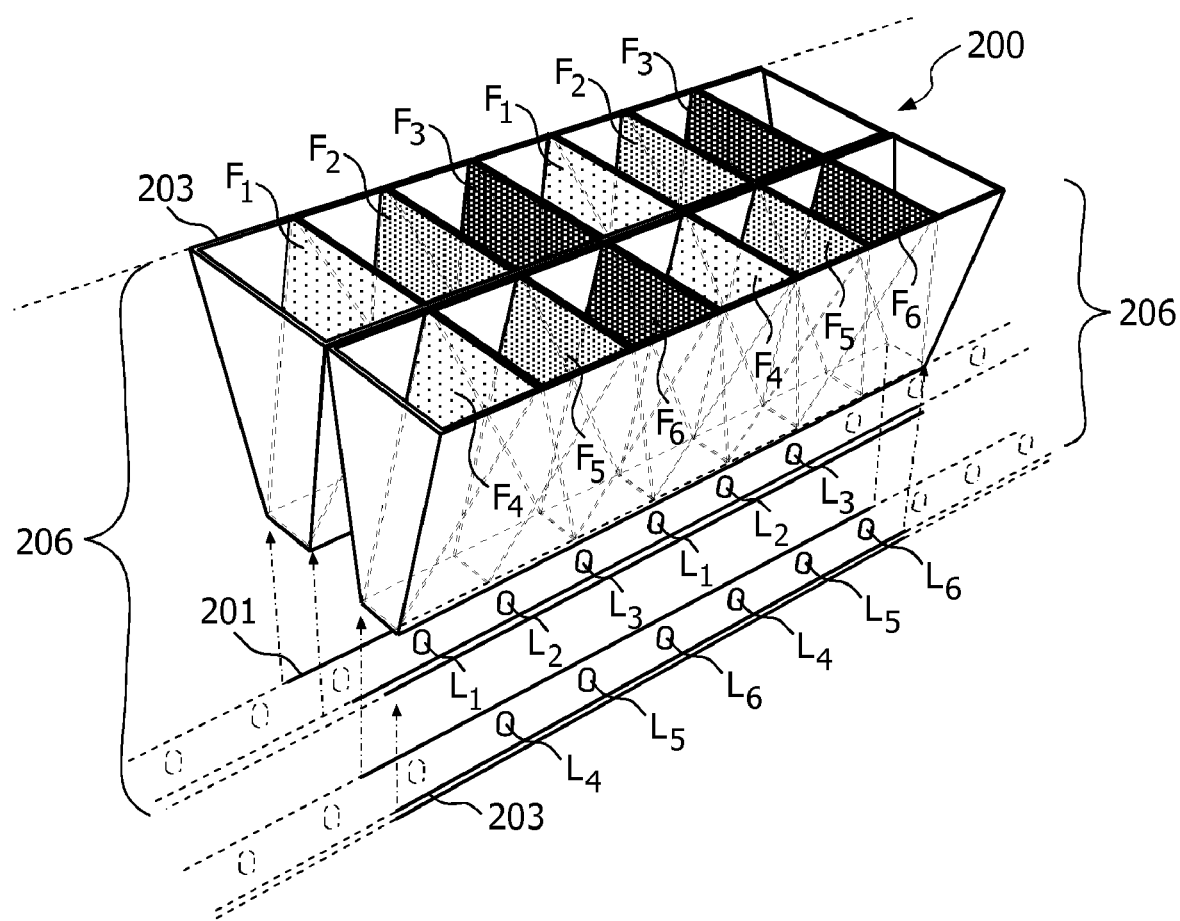
FIG. 3 illustrates an illumination system according to a second embodiment of the invention, having two sets of light sources and color filters acting as light mixing devices.

FIG. 3 illustrates another preferred embodiment of an illumination system 200 according to the present invention. The illumination system 200 comprises a first set 201 and a second set 202 of light sources coupled to a first 203 and a second 204 light mixing device. The first set 201 of light sources together with the first light mixing device 203 forms a first sub-system 205, while the second set 202 of light sources together with the second light mixing device 204 forms a second sub-system 206. In this embodiment, the light mixing devices comprises dichroic color filters, $F_1$-$F_6$. A dichroic color filter is an optical device which passes or reflects only certain wavelengths of light. With an increased number of different colored light sources the filters become more costly and difficult to manufacture, i.e. going from two to three different colored light sources requires band reflection filters instead of step filters, and reflective step filters are much easier to make than band reflection filters, especially if it needs to have very sharp edges. Furthermore, with more different colors, the flanks of the color filters need to be steeper. In the case when LEDs are used as light sources, the tail of the light source spectra will start to overlap, thereby making it impossible to correctly mix colors using this method. Therefore, the present embodiment uses a limited number of different colored light sources coupled to each light mixing device. The first set 201 comprises two blue $L_1$, two green $L_2$ and two red $L_3$ LEDs having peak wavelengths of 475, 530 and 650 respectively, and the second set 202 comprises two violet $L_4$, two blue/green $L_5$ and two orange $L_6$ LEDs having peak wavelengths of 450, 500 and 600 respectively. An illumination system as illustrated in FIG. 3 can of course comprise more than two light sources of each color in each sub-set (as illustrated by the dotted lines).

Figure 4:
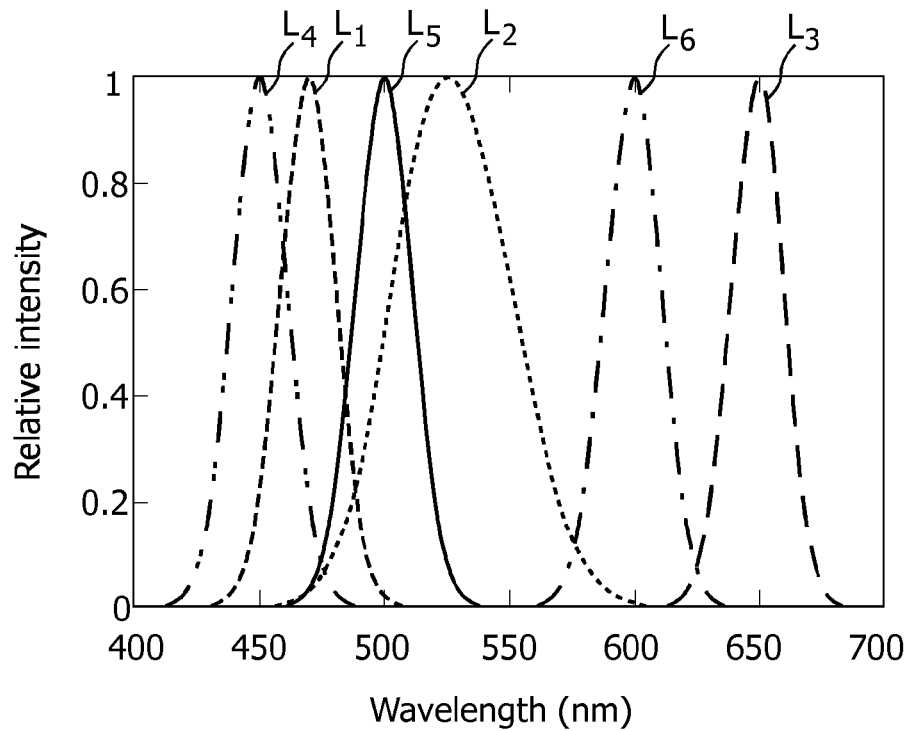
FIG. 4 is a graph showing an example of spectral distribution of the two sets of LED light sources in FIG. 3.

In FIG. 4 the spectral distribution of the two sets of LED light from FIG. 3 are shown. As can be seen in the graph, the spectral distribution for the second set 202 of light sources $L_4$-$L_6$ compensates for the spectral distribution of the first set 201 of light sources $L_1$-$L_3$, so that the combined spectrum for the illumination system forms a more evenly distributed spectrum. For example, the peak from the blue/green $L_5$ LED in the second set 202 here compensates the minimum between the peaks from the blue $L_1$ and the green $L_2$ LEDs in the first set 201. The illumination system according to this embodiment of the present invention has a spectral distribution within the visible spectrum (400-700 nm), that has a relative intensity that is more than 0.5 for at least 50% of the visible spectrum. By using at least two sub-systems with at least three different colored light sources in an illumination system according to the present invention, it is possible to achieve a color rendering index of at least 80. A normal value for a typical cool white fluorescent lamp is about 65.

Figure 5:
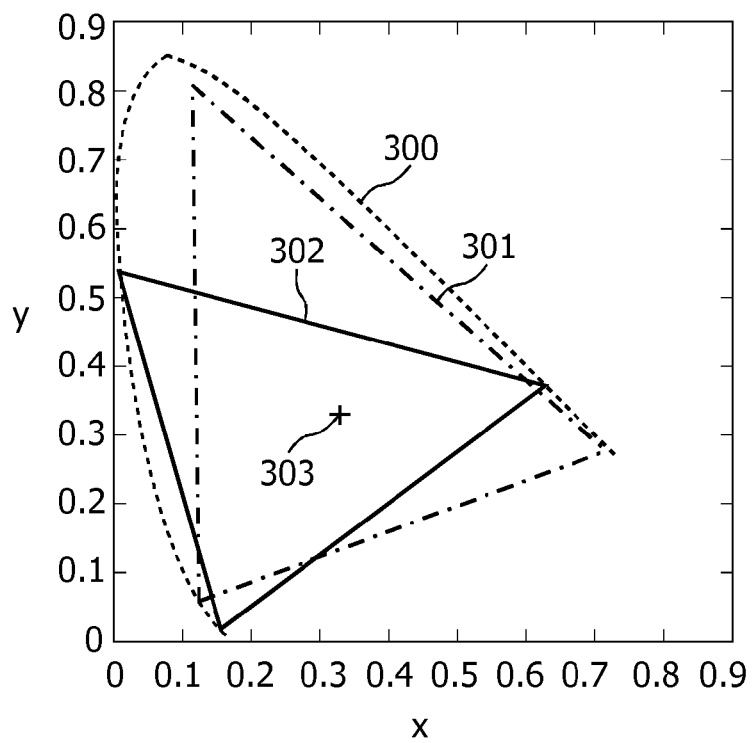
FIG. 5 is a CIE color space chromaticity diagram showing the color points of the two sets of LED light sources from FIG. 4.

FIG. 5 is a CIE (International Commission on Illumination) color space chromaticity diagram showing the color points of the two sets 201, 202 of LED light sources $L_1$-$L_6$ from FIG. 3. The outer horseshoe-shaped curve 300 corresponds to the colors of the visible spectrum (color points of monochromatic light). The two inner triangular curves 301 and 302 correspond to the first 205 and second sub-system 206 (with sets of LEDs) respectively, and the outer end points of the triangular curves 301 and 302 relate to the peak wavelengths of the LEDs in the first and second sub-system 205, 206. The point 303 in the center of the diagram represents a white color point. As can be seen in the diagram, both the sub-systems 205, 206 can generate white light by turning on all three LEDs in each of the sub-systems at the same time.

The person skilled in the art realizes that the present invention by no means is limited to the preferred embodiments described above. On the contrary, many modifications and variations are possible within the scope of the appended claims. For example, by introducing additional sub-systems, where the light sources have been selected to even further compensate for local minima in the spectrum, it would be possible to achieve a color rendering index of 90 and above. The present invention is furthermore advantageously used in a general purpose lighting system, such as in a spot light system.

The invention claimed is:

1. An illumination system comprising:
a first sub-system including
a first set of at least two differently colored light sources, said first set having a first spectral distribution;
a first light mixing device arranged in a direction of emission of light from said first set of light sources and configured to mix light emitted by said first set of light sources;
a second sub-system including
a second set of at least two differently colored light sources, said second set having a second spectral distribution; and
a second light mixing device arranged in a direction of emission of light from said second set of light sources and configured to mix light emitted by said second set of light sources;
wherein said first and said second sub-systems are arranged to emit at least one common color;
wherein said light sources are selected such that said first and said second spectral distribution complement each other, so that a color rendering index (CRI) of light emitted from said illumination system is greater than the CRI of light emitted from each of said subsystems; and
wherein said at least two light sources in the second set are selected such that said second spectral distribution compensates for at least one local minimum in said first spectral distribution.

2. An illumination system according to claim 1, wherein said illumination system is a color variable illumination system.

3. An illumination system according to claim 1, wherein a spectral distribution for said illumination system, including said first and said second spectral distribution, has a relative intensity that is more than 0.5 for at least 50% of the visible spectrum.

4. An illumination system according to claim 1, wherein at least one of the first spectral distribution and the second spectral distribution for said illumination system has a relative intensity that is more than 0.5 for at least 70% of the visible spectrum.

5. An illumination system according to claim 1, wherein said light mixing devices mixes light such that an essentially uniform spatial and angular color distribution is achieved.

6. An illumination system according to claim 5, wherein said light mixing device comprises reflective color filters.

7. An illumination system according to claim 5, wherein said light mixing device comprises at least one waveguide.

8. An illumination system according to claim 1 further comprising means for adjusting the intensity of each of said light sources.

9. An illumination system according to claim 1, wherein said light sources are narrow banded light sources selected from a group comprising LEDs, OLEDs, PLEDs, an organic LEDs, lasers, CCFLs, HCFLs, plasma lamps.

10. A backlighting system comprising an illumination system according to claim 1.

11. A display device comprising a display and an illumination system according to claim 1.

* * * * *